Patented Oct. 21, 1924.

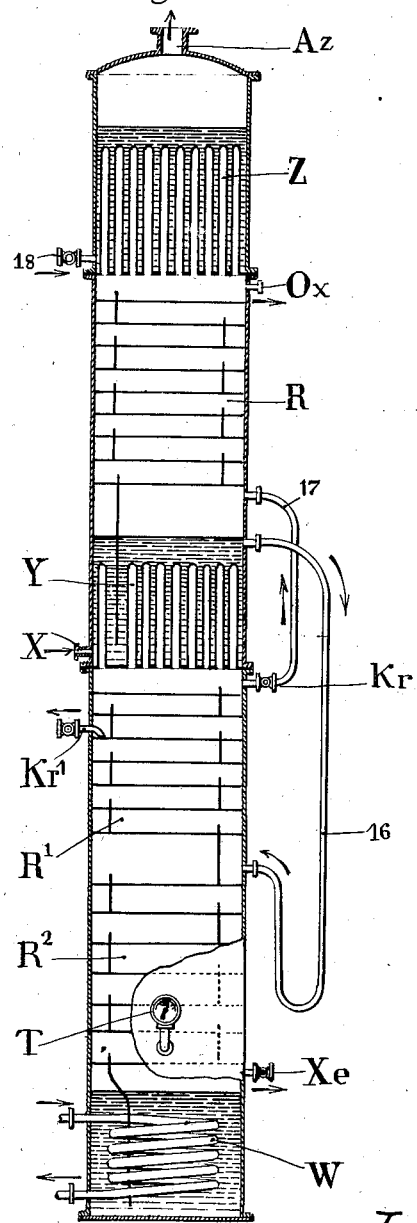

1,512,268

UNITED STATES PATENT OFFICE.

EMILE AUGUSTIN BARBET, OF PARIS, FRANCE.

PROCESS FOR THE SEPARATION AND PURIFICATION OF ARGON AND OTHER RARE GASES OF THE ATMOSPHERE.

Application filed July 8, 1919. Serial No. 309,298.

*To all whom it may concern:*

Be it known that I, EMILE AUGUSTIN BARBET, a citizen of the French Republic, residing at No. 5 Rue de l'Echelle, Paris, France, have invented certain new and useful Improvements in Processes for the Separation and Purification of Argon and Other Rare Gases of the Atmosphere, of which the following is a specification.

The present invention has for its object to provide a process of producing in a pure state the rare gases contained in the air.

The present invention may be applied to the various known apparatus for rectifying liquid air. In any case it will be absolutely necessary to improve their working and more particularly to assure the absolute invariability of their rate of working by the use of the automatic or non-automatic means of regulation.

1. *Rectification of argon.*—The volatility of argon is intermediate between that of nitrogen and that of oxygen. Argon has therefore a tendency to accumulate in a stage of the column which is located a few plates below the entrance of the air to be rectified.

If a proportion of rare gases equal in volume to 4% of the volume of rectified air be withdrawn, then with a properly constructed and properly worked plate column there should remain no argon at all either in the nitrogen at the head, nor in the oxygen at the tail, and consequently the extracted 4% will contain the 0.94% of argon contained in the air. The percentage of argon in this extraction will therefore be:

$$0.94 \times \frac{100}{4} = 23.50\%$$

According as the volume of the extraction is diminished, the percentage of this extraction in argon would increase without however it being possible to attain 100%, because an increasingly considerable portion of the argon will contaminate both the nitrogen at the top and the oxygen at the bottom.

The continuous rectification of any kind of mixtures will be the more successful the more absolutely regular is the rate of working of the said rectification, as above stated, and in the first place it is desirable that the fluid to be rectified which is supplied to the apparatus, should have as constant a composition as possible.

If this regular ty of composition is desirable in the rectification of liquid air, it is no less important in the treatment of the argoniferous mixture in accordance with the present invention in order to effect its complete purification by rectification.

The first object to be achieved is to have in the argoniferous mixture only an extremely minute proportion of nitrogen; this to be as a permanent feature.

The advantage will be great because it enables the purification of argon to be performed in a single column as subsequently described in detail, whilst if the nitrogen is present in any considerable proportion, for instance 4 to 5%, and especially if the proportion is still greater, it will be necessary to employ two successive columns, one of which will serve for instance for eliminating the oxygen, so that the second column will then only have to deal with a binary mixture of nitrogen and argon. In this last column the argon will be collected at the bottom of the apparatus and the nitrogen at the top thereof.

If desired the order of succession of these two operations may be reversed, that is to say, the first stage may be the elimination of the nitrogen as head products. Then from the bottom of this first apparatus there would be obtained a binary mixture of oxygen and argon which would be treated in gen and argon which would be treated in the second rectifying column in order to give pure argon at the head and completely de-argonized oxygen at the tail.

Each of the two apparatus, irrespectively of the order of succession in which they are employed, will require its usual accessories, such as condensers, coolers, recuperators, regulators, thermometers, etc. All these of course will have a capacity of one twentieth of those required for the main rectifier of the liquid air, but the complication will not be any the less inconvenient. Consequently it is of extreme importance to utilize the improvements hereinafter described which have the result of requiring only a single argon column and of furnishing this argon in a state of absolute purity.

Instead of these two continuous apparatus combined together, it would appear possible to have recourse simply to the old fashioned boiler rectifier working on successive charges, and producing the fractionations in the time order of the successive drawings-off at the test cock. This arrangement however would be inapplicable for dealing with liquefied gases. Such gases require the provision of reservoirs for storing the successive charges and likewise for storing the mixed products issuing from the test cock, which products require a fresh rectification. The final yield of pure argon would be very small. The continuity of the rectifying operation is alone capable of solving the problem completely and practically, but it is necessary to simplify the operation.

Apparatus for carrying the invention into effect is illustrated in the accompanying example, in which:—

Figure 3 illustrates an arrangement of apparatus for recovering krypton and xenon.

Figure 1:
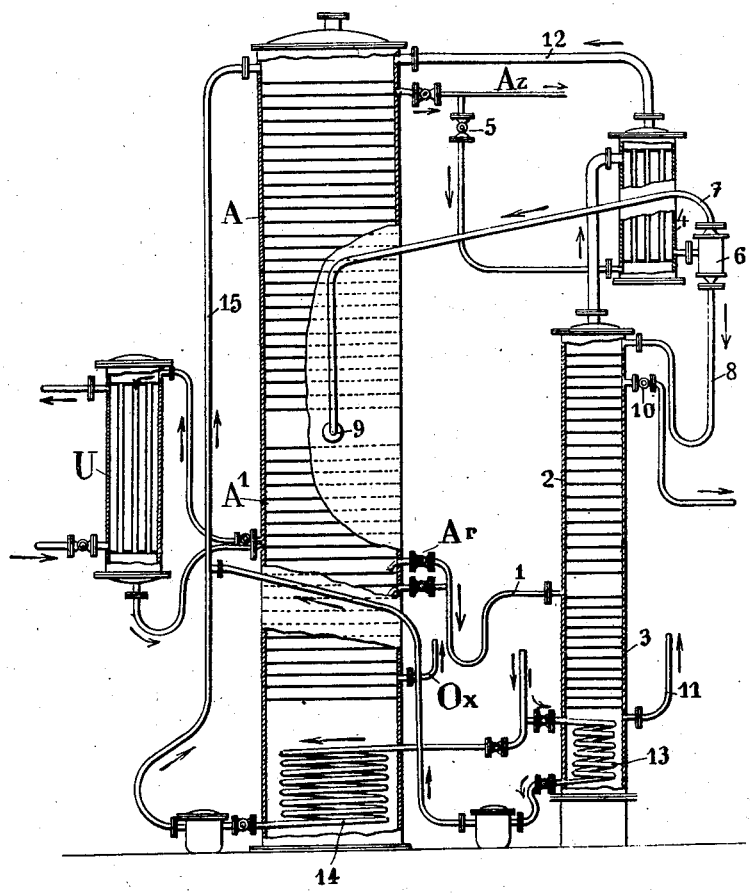
Figure 1 illustrates apparatus for recovering argon in a state of purity.

As above stated, a single continuous column for rectifying the argon might be sufficient provided that there is only a small proportion of nitrogen in the raw argoniferous liquid to be rectified. This first result is to be obtained from the liquid air rectifier.

With this object, some twenty plates are arranged in the lower portion $A^1$ of the column $A \ A^1$ where the distillation proper of the liquid air takes place for the purpose of effecting a progressive exhaustion of the nitrogen which passes out at $Az$ while the oxygen passes out at $Ox$. The extraction of the argoniferous liquid will take place only towards the middle of this plate column $A^1$. It is very easy to regulate the working of this apparatus in such a manner that at that stage there will remain scarcely 1% of nitrogen in the argoniferous liquid.

This result may likewise be facilitated by the cooling effect due to employment of the cooler U which is a heat interchanger of any suitable construction within which liquid air circulates.

Since the argoniferous liquid extracted at $Ar$ from the air rectifier $A \ A^1$ contains only a very small quantity of nitrogen, its rectification in the single column 2—3 will be easily effected by means of the principle of "pasteurization" or "self-purification" by automatic re-ebullition of the refluxes.

The impure argoniferous liquid extracted at $Ar$, regulated by a suitable cock, passes into the column 2—3 through a siphon-tube 1.

The distillation of the liquid, that is to say, the expulsion of the most volatile parts, namely nitrogen and argon, takes place in part 3 of the column so as to allow only the least volatile part, namely the oxygen, to enter the base of the apparatus.

The heating of the base is done in the same manner as in the case of the air rectifier $A \ A^1$ by means of a worm 13 in which flows cold gaseous nitrogen under a pressure of 4 or 5 kgs. The nitrogen becomes liquefied, and gives up its latent heat of liquefaction to the liquid oxygen which is brought to ebullition.

A suitable proportion of this oxygen in the form of vapour is extracted at 11, and passes into recuperators on its way to the gas-holder. These appliances are not shown.

The liquefied nitrogen in the worm 13 passes from the trap $13^a$ and unites with that contained in the worm 14 in $A \ A^1$, which passes through the trap $14^a$ and both bodies of nitrogen rise together through the pipe 15 to the upper plate of the rectifier $A \ A^1$.

The oxygen vapours that rise and bubble up in the plates 3 are condensed and in their turn vaporize the argon and the nitrogen which is more volatile than oxygen.

The plates 2 effect the rectification proper, the object of which is to retain the oxygen vapours that have been carried over, and to allow solely the argon and the nitrogen to pass over.

On leaving the upper plates of 2, the mixture which is very rich in argon, but poor in nitrogen, passes to the condenser 4 whose tubes are immersed in pasteurized liquid nitrogen drawn from the top of the rectifier $A \ A^1$. The proportion of this mixture is regulated by the cock 5 in such a manner that in 4 there are liquefied 8 or 9 tenths of the vapour argon+nitrogen which enters therein. This condensation is not capable of suitably fractionating the mixture. In fact, the non-condensed portion will contain a larger proportion of nitrogen than the mixture passing into 4, but nevertheless there will be a certain proportion of nitrogen still contaminating the liquefied argon.

The liquid and non-condensed vapour pass into the separator 6. The gas composed of nitrogen and argon issues through 7, and returns at 9 into the rectifier $A \ A^1$, whereas the liquefied portion returns through the siphon-tube 8 to the top of the plates 2 and constitutes the retrogradation owing to which the refining or the rectification will be effected in the plates 2.

When the reflux returned through 8 is subjected to ebullition on the upper plates of 2, the more volatile parts, namely the nitrogen, are driven off, and consequently on some plates lower down the liquid is composed only of pure argon, namely pasteurized argon, which is extracted through the cock 10 and is conveyed to the cold units recuperator, and thence to a meter and a gas-holder not shown in the drawings.

The gases extracted at 7 might instead of entering the rectifier A A¹, pass through the recuperators and be lost in the air, but this is obviously less advantageous.

Finally, if a high purity of the argon is not required, and if there is no objection to its containing 1 to 2% of nitrogen, the purification by pasteurization in 2—3 may be dispensed with, and in such a case the condensation taking place in 4 is omitted and the whole of the gaseous products given off in 7 are removed. This is argon of a purity of 98 to 99% quite free from oxygen.

The liquid nitrogen employed for effecting condensation in 4 may be taken from any other source of supply, and particularly from the nitrogen taken from any source which serves to cool the heat interchanger U or from the nitrogen which is condensed in the worms of the base of the column. Whatever its origin, the condensation produced by it has as its counterpart the production of an equivalent quantity of nitrogen vapour. This nitrogen vapour might be passed through recuperators of cold units and passed finally into the nitrogen gas-holder. It is however more simple to return it through the pipe 12 to the top of the rectifier A A¹ to become mixed with the remainder of the pure gaseous nitrogen.

The argon rectifying column, which in the drawings is shown closely combined with the continuous rectifier for liquid air, might constitute a separate apparatus with recuperators, regulators, thermometers, liquid nitrogen, gas meters, etc., and more particularly in the case where a plurality of liquid air rectifiers should be comprised in one and the same works, in which case a single rectifying column might be allotted to deal with the total of the impure argoniferous liquids extracted in the various air rectifiers.

2. *Rectification of neon and helium*.—The three more volatile gases existing in air, namely neon, hydrogen and helium may be extracted by subjecting the liquid nitrogen to expansion in a suitable device. The expansion produces a slight evaporation and the latter carries over with it the three light gases which exist in air in only very minute quantities.

If the extraction performed in this manner corresponds to 2% of the volume of air brought into rectification, which 2% contains all the neon, hydrogen and helium it will be immediately understood that the rear gases are 50 times more concentrated in this extraction than they were in the air. The whole of the remainder consists of nitrogen, and the proportion of this nitrogen is still so high that if this mixture is subjected to a suitable compression followed by an adiabatic expansion whilst doing work, a total liquefaction will be produced including the helium. The same result is obtained if the compressed gas is forced into a worm immersed in a bath of liquid nitrogen.

Figure 2:
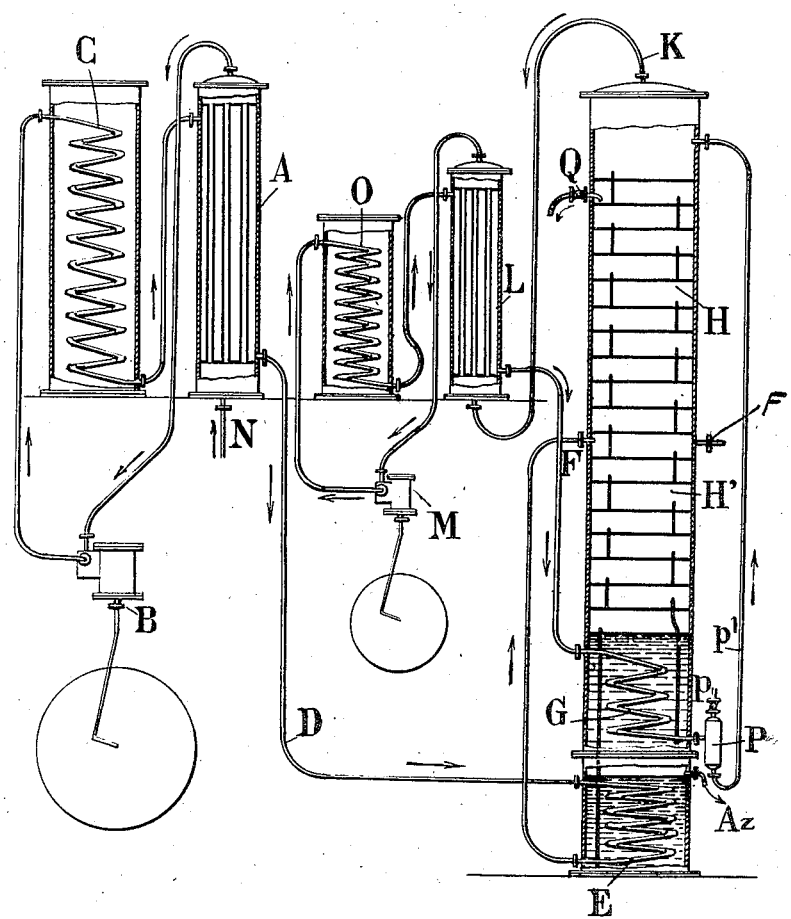
Figure 2 illustrates apparatus for recovering pure neon and helium.

This mean that this mixture of nitrogen and light gases can give rise to a fresh continuous rectification analogous in its principle to the continuous rectification of liquid air, but suitably adapted for separating in a pure state the several components. This apparatus is shown in Fig. 2.

The mixture of nitrogen, neon, hydrogen and helium entering at N passes into a recuperator A, and thence passes to the compressor B which need only produce a pressure of 2 to 3 kgs. The hot compressed gas is cooled in the water worm C, and passes hence to the recuperator A, and thence through the pipe D to the worm E immersed in pure liquid nitrogen.

The pure nitrogen is brought to ebullition and passes out at A2; from which it may be passed through suitable recuperators, and thence into a gas meter, and finally into the gas-holder. Or it may be conveyed simply and directly to the upper plates of the apparatus for rectifying liquid air.

The nitrogen mixed with rare gases is liquefied in the worm exactly at the rate that the pure nitrogen is vaporized. The resulting liquid rises in F. This constitutes the feed for the rectifying column H H'. H' contains the distilling plates designed to cause the neon, hydrogen and helium to be given off from the liquid nitrogen. The liquid arriving at the base G, contains only pure nitrogen which will accumulate therein and overflow by way of the pipe G', indicated in dotted line, into the base of the column in which the coil E is arranged.

The plates H are rectifying plates; they are charged with liquid neon mixed with more or less nitrogen. A mixture of vapours of neon, hydrogen, and of helium issues from the top of the apparatus at K, but no nitrogen at all, although nitrogen predominated so considerably in the feed at F.

There is now to be described the manner in which there is produced at the base of H' the ebullition which is capable of effecting the rectifying distillation. The ternary mixture passing out of K passes through a recuperator L and is sucked by a powerful compressor M. The vapours under pressure are cooled by a water worm O and pass into the recuperator L. Thence they pass to the worm situated in the base G containing pure nitrogen.

The compressor M will produce a sufficient pressure to cause the whole of the neon and a portion of the hydrogen to become liquefied in the worm in G. There is no objection to a small quantity of helium being carried over into the liquefaction, whereas it will be a great disadvantage if the whole of the neon were not condensed.

The mixture of liquid and non-condensed gas passes into the separator P.

The discharge of the gases is regulated by means of the cock $p$ in such a manner as to leave the gases in P to have a pressure of about ½ kg., this pressure being necessary in order that the liquid in P should rise of itself to the upper plate of H through the pipe $P^1$.

As above stated, this liquid is composed of neon and a certain proportion of hydrogen with traces of helium. The partial expansion occurring in P generates a small vaporization, whereby more particularly helium and hydrogen are freed. On entering the top of H and being subjected to ebullition, the liquid loses the hydrogen which is much more volatile than the neon, so that 1—2 or 3 plates lower down there can be extracted at Q the liquid pasteurized neon which is very pure and very thoroughly rectified. The re-vaporized hydrogen mixed with neon, recommences the cycle through the recuperator L, the compressor M and the worm in G.

The gases given off at $p$ consist only of hydrogen and helium if the compression in M has been sufficient. This mixture passes through the usual cold units recuperators before passing into a gas meter and then into a special gas-holder.

From this binary mixture pure helium may be obtained by introducing sufficient oxygen into the mixture to combine with the hydrogen causing the hydrogen and oxygen to combine and separating the water thus formed from the helium which may then be stored in a gas-holder. Alternatively the absorbent properties of wood charcoal may be utilized in effecting the separation of the hydrogen and helium.

It is to be noted that there is a strict relation between the vaporization in the base G and the quantity of vapour contained at the top of the plates H. Nevertheless owing to the loss of cold units by radiation it will be necessary to supply to the apparatus a quantity to make up for this loss. This quantity is added in the form of pure liquefied nitrogen which is introduced into the apparatus by the inlet F'.

3. *Rectification of the xenon and krypton.*—If the proportion of the two rare gases xenon and krypton obtained at the bottom of a liquid air rectifier is reduced to a hundredth part of the volume of the air subjected to rectification, and the whole of the krypton present in the original volume of air is contained in this fraction, it is obvious that the xenon and the krypton will be in a state of 100 times greater concentration than in the air. The remainder of the mixture consists of oxygen.

The mixture of xenon and krypton might be separated from oxygen by the eudiometric method, by adding hydrogen in a proportion to be determined by analysis in order to combine with any oxygen in the mixture.

It would however be preferable to make a fresh rectification, which is not difficult because the boiling points of the three gases are very far apart, namely:

Oxygen, degrees absolute, 90°5; krypton, 121°, difference, 30°5; xenon, 164°, difference, 43°.

Although the mixture is a ternary one, the separation can be done in a single column owing to these great differences in temperature.

The ternary mixture of oxygen, krypton, xenon, is extracted in the liquid state from the large liquid air rectifier, and it is introduced continuously through X into the column R, $R^1$, $R^2$ (Fig. 3).

Y is a tubular apparatus with "blind" tubes, that is to say, tubes closed at their upper ends and immersed in the ternary liquid to be rectified. This tubular apparatus represents the alcohol heater of ordinary distilling columns. The krypton vapours produced in $R^1$ of 121° absolute bring this liquid to boiling, and drive almost the whole of the oxygen out of it. The boiling point of the mixture is very near 118 to 119° absolute, that is to say, 27 to 28° higher than the boiling point of oxygen. The removal of the oxygen is therefore almost complete. The overflow of this liquid will pass down through the siphon-tube 16 into the middle of the column $R^1$, $R^2$.

$R^2$ are the distilling plates, namely, the plates for removing the krypton. Only pure xenon should remain in the boiler W. The thermometer T should indicate 164° absolute. A continuous extraction of this pure xenon is made at Xe for the purpose of delivering it into the gas-holder by way of recuperators and a gas meter.

The krypton vapours are rectified in the plates $R^1$ by reason of the refluxes produced by the boiling of the ternary liquid in Y. Since a little oxygen may remain, pasteurization is performed, that is to say, a certain quantity of krypton vapours contaminated with oxygen is drawn at Kr and delivered by the pipe 17 into the base of R, whilst one or two plates lower down the re-boiled, pasteurized krypton wholly freed from oxygen is extracted at $Kr^1$. This liquid will pass as before through recuperators and a gas meter before entering its gas-holder.

R are the oxygen rectifying plates designed for freeing the oxygen from the carried-over krypton. For this purpose a retrogradation is required. This retrogradation is effected in the tubular apparatus Z composed of "blind" tubes immersed in liquid nitrogen. This liquid nitrogen will come from a liquid air rectifier; it will enter at 18; will be converted into vapour that will issue at A$z$ and enter the top of the rectifier A, A$^1$. The liquefied oxygen will redescend on the plates forcing out the krypton. The gaseous oxygen is extracted at O$x$ and is passed through recuperators and a gas meter into the gas-holder, or it may be admitted into the bottom of the large air rectifier.

There still remains to describe the manner in which the whole of this column R, R$^1$, R$^2$ is supplied with the necessary heat. For this purpose a worm is arranged in the base W, and through this worm there may be passed a current of dry air of normal temperature or of a temperature slightly below normal. This air will be cooled to about 173° C., absolute (—100°) C. and will be utilized for its cold units for feeding the large liquid air rectifier.

What I claim is:

1. Process of obtaining the rare gases present in air, which comprises subjecting the liquefied mixtures of the rare gases containing a proportion of the commoner constituents of air to a continuous rectification process, employing the condensed distillate of the higher boiling fractions derived in the rectification operation as a reflux and withdrawing a proportion of the reflux in the form of one of the rare constituents of air in a state of purity and as a liquid after it has been subjected to re-ebullition by the ascending gases.

2. Process of obtaining the rare gases present in air which comprises causing a liquefied mixture of the rare gases containing a proportion of the commoner constituents of air to travel in a downward direction and form a plurality of bodies of liquid, causing the gases produced by supplying heat to the mixture to travel in the reverse direction and pass through successive bodies of liquid, supplying to one of said bodies of liquid the condensed distillate of the higher boiling constituents of the mixture treated and withdrawing a neighbouring lower body of liquid which has been subjected to re-ebullition by the ascending gases and is one of the rare constituents of air in a state of purity.

In testimony whereof I have signed my name to this specification.

EMILE AUGUSTIN BARBET.